No. 681,825. Patented Sept. 3, 1901.
A. C. GILLESPIE & J. C. DAVIS.
INSECT EXTERMINATOR.
(Application filed June 18, 1901.)
(No Model.)
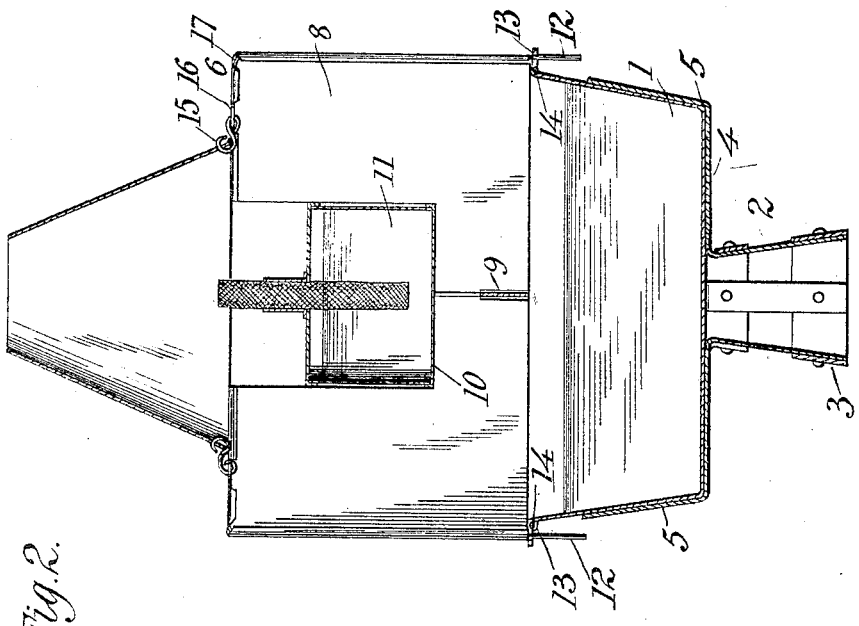
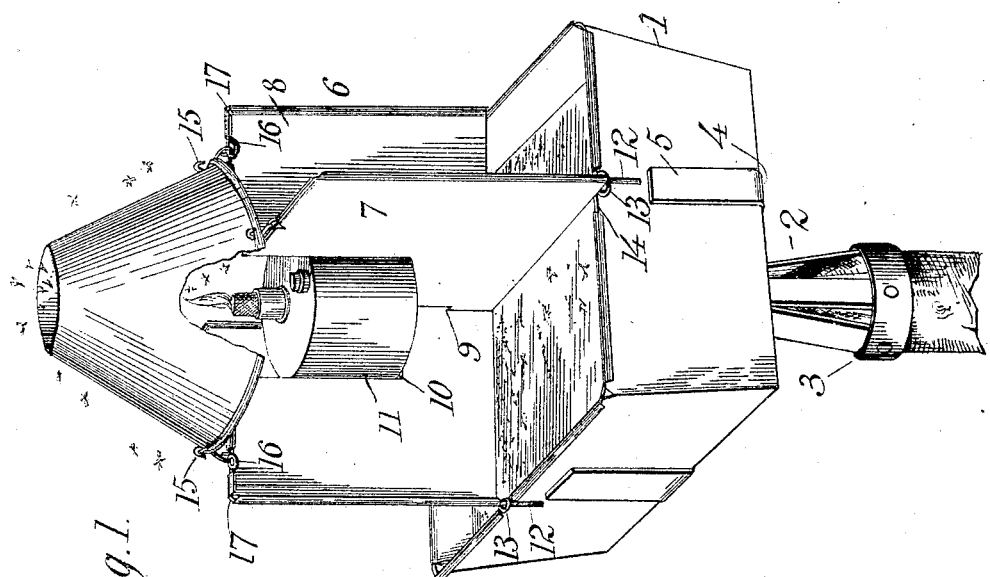
A. C. Gillespie and
J. C. Davis
Inventors

UNITED STATES PATENT OFFICE.

ALBERT C. GILLESPIE AND JOSEPH C. DAVIS, OF PITTSFIELD, ILLINOIS.

INSECT-EXTERMINATOR.

SPECIFICATION forming part of Letters Patent No. 681,825, dated September 3, 1901.

Application filed June 18, 1901. Serial No. 65,000. (No model.)

*To all whom it may concern:*

Be it known that we, ALBERT CALVIN GILLESPIE and JOSEPH CRAIG DAVIS, citizens of the United States, residing at Pittsfield, in the county of Pike and State of Illinois, have invented certain new and useful Improvements in Insect-Exterminators; and we do declare the following to be a full, clear, and exact description of the invention, such as will enable others skilled in the art to which it appertains to make and use the same.

The invention relates to insect-exterminators.

The object of the invention is to provide a device of this character which shall be simple of construction, durable in use, comparatively inexpensive of production, and which is primarily intended to be placed among the branches or foliage of trees or shrubbery to attract and destroy the parent insects before they have an opportunity to deposit their eggs, thus protecting the fruit from the harmful influences of the insects.

With this and other objects in view the invention consists of certain novel features of construction, combination, and arrangement of parts, which will be hereinafter more fully described, and particularly pointed out in the appended claims.

In the accompanying drawings, Figure 1 is a perspective view of our improved insect-destroyer, showing it secured to the upper end of a pole or standard which is adapted to be projected into the branches or foliage of trees and brushes; and Fig. 2 is a longitudinal vertical sectional view.

In the drawings, 1 denotes a pan or vessel adapted to contain a poisonous liquid, and 2 denotes a holder for the pan or vessel, which preferably consists of a tubular shank 3, provided with radiating arms 4, having upwardly-extending branches 5, which are designed to embrace the sides of the pan or vessel. The holder is adapted to have its tubular portion slipped over the end of a pole or standard, so that the holder may be placed up in the branches or foliage of trees or shrubbery.

6 denotes the reflectors, which consist of highly-polished metal sheets 7 and 8, which cross each other and are connected together in any suitable manner, preferably by forming the lower edges of the sheets with interlocking slits 9. Above the slits in the sheets are formed recesses to present a seat 10 for a lamp 11. The sheets are provided at their outer ends with downwardly-projecting pins 12, which are adapted to project into eyes 13, formed in a wire 14, beaded to the upper edge of the pan or vessel, thus supporting said reflectors in proper position and at the same time permitting of their ready removal when they are not desired to be used. These sheets of which the reflectors are formed are easily disconnected and packed into small compass. Detachably secured to the upper ends of the sheets and above the lamp is a combined chimney and conical deflector. This deflector is provided with hooks 15 in its base which are adapted to engage eyes 16, formed in wires 17, beaded to the upper ends of the reflectors. The light from the lamp will be deflected downwardly by the deflector and against the wings of the reflectors, so as to obtain an increased reflection of light from the lamp, and thus attract the insects, some of which will be consumed by the blaze of the lamp, while others will strike against the reflectors and deflector and fall into the poisonous liquid within the pan and be destroyed.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described our invention, what we claim, and desire to secure by Letters Patent, is—

1. In an insect-exterminator, the combination with a pan or vessel, of reflectors vertically disposed above the pan or vessel, a lamp supported by the reflectors, and a conical deflector arranged above the reflectors, substantially as set forth.

2. In an insect-exterminator, the combination with a pan or vessel, of reflectors vertically disposed above the pan or vessel, a lamp supported by the reflectors, and a conical deflector arranged above the reflectors, the reflectors being removable from the pan or vessel, and the deflector being removable from the reflectors, substantially as set forth.

3. In an insect-exterminator, the combination with a pan or vessel, of reflectors vertically disposed above the pan or vessel, a lamp supported by the reflectors, a conical deflector arranged above the reflectors, and a holder consisting of a tubular body having supporting-arms to embrace the pan or vessel, said tubular body being adapted to be slipped over the end of a pole or standard, substantially as set forth.

In testimony whereof we have hereunto set our hands in presence of two subscribing witnesses.

A. C. GILLESPIE.
J. C. DAVIS.

Witnesses:
J. R. TICKER,
C. S. ARMOUR.